United States Patent [19]

Gallant

[11] Patent Number: 5,325,298
[45] Date of Patent: Jun. 28, 1994

[54] METHODS FOR GENERATING OR REVISING CONTEXT VECTORS FOR A PLURALITY OF WORD STEMS

[75] Inventor: Stephen I. Gallant, Cambridge, Mass.
[73] Assignee: HNC, Inc., San Diego, Calif.
[21] Appl. No.: 753,894
[22] Filed: Sep. 3, 1991

Related U.S. Application Data

[63] Continuation-in-part of Ser. No. 610,430, Nov. 7, 1990.
[51] Int. Cl.$^5$ ............................................ G06F 15/21
[52] U.S. Cl. .................... 364/419.19; 315/144
[58] Field of Search ................................ 364/419.19; 395/144–146, 148

[56] References Cited

U.S. PATENT DOCUMENTS 4,247,892 1/1981 Lawrence ............................ 395/200
4,864,502 9/1989 Kucera et al. .................. 364/419.08

OTHER PUBLICATIONS

Massively Parallel Parsing: A Strongly Interactive Model of Natural Language Interpretation, Waltz, Polack.
Connectionist Parsing, Cottrell.
Application of the Interactive Activation Model to Document Retrieval, Bein, Smolensky.
Indexing by Latent Semantic Analysis, Deerwester.
WEIRD: An Approach to Concept-Based Information Retrieval, Koll, Matthew B.
On Modeling of Information Retrieval Concepts in Vector Spaces, Wong, S. K. M.
Classification Space: A Multivariate Procedure for Automatic Document Indexing and REtrieval, Ossorio, Peter G.
A Practical Approach for Representing Context And for Performing Word Sense Disambiguation Using Neural Networks, Gallant, Stephen I.
Adaptive Information Retrieval: Using a Connectionist Representation to Retrieve and Learn About Documents, Belew, Richard K.
Parallel Distributed Processing Exploration in the Microstructure of Cognition vol. 2: Psychological and Biological Models, McClelland, Rumelhart.

*Primary Examiner*—Gail O. Hayes
*Attorney, Agent, or Firm*—Robert M. Asher

[57] ABSTRACT

A method for generating context vectors for use in a document storage and retrieval system. A context vector is a fixed length list of component values generated to approximate conceptual relationships. A context vector is generated for each word stem. The component values may be manually determined on the basis of conceptual relationships to word-based features for a core group of word stems The core group of context vectors are used to generate the remaining context vectors based on the proximity of a word stem to words and the context vectors assigned to those words. The core group may also be generated by initially assigning each core word stem a row vector from an identity matrix and then performing the proximity based algorithm. Context vectors may be revised as new records are added to the system, based on the proximity relationships between word stems in the new records.

17 Claims, 13 Drawing Sheets

METHODS FOR GENERATING OR REVISING CONTEXT VECTORS FOR A PLURALITY OF WORD STEMS

This is a continuation-in-part of pending U.S. application Ser. No. 07/610,430, filed Nov. 7, 1990.

BACKGROUND OF THE INVENTION

The present invention is directed to a method for storing records that permits meaning sensitive and high speed subject area searching and retrieval. The same method may be used for word sense disambiguation, (e.g., "star" in the sky vs. movie "star"). The invention is further directed to methods for generating context vectors to be associated with word stems for use in the record storage and retrieval method.

The most common method of record storage and retrieval involves storing all records word for word and then searching for key words in the records using inverted indexes (Salton, G., Automatic Text Processing: The transformation analysis and retrieval of information by computer, Addison-Wesley, 1989.) The key word searches are performed by doing a complete search through all of the contents of the data base that contain a list of query words. Such systems have no knowledge that "car" and "automobile" should be counted as the same term, so the user must include this information by a complex and difficult-to-formulate query. Some systems try to solve this problem by a built-in thesaurus, but such systems lack "meaning sensitivity" and miss many obvious facts, for example, that "car" is closer to "road" than to "hippopotamus." It is an object of the present invention to provide a more meaning sensitive method of storage and retrieval that allows simplified queries and reduces the computing capacity required for any particular data base.

There is currently much research and development in the fields of neural networks (Rumelhart, D. E. & McClelland, J. L., (eds.) Parallel Distributed Processing: Explorations in the Microstructures of Cognition, Vol. 1 and Vol. 2 MIT Press, 1986; Anderson, J. A. and Rosenfeld, E. (eds.), Neurocomputing, A Reader, MIT Press, 1988; Hecht-Nielson, Neurocomputing, Addison-Wesley, 1990). A neural network consists of a collection of cells and connections between cells, where every connection has an associated positive or negative number called a weight or component value. Cells employ a common rule to compute a unique output, which is then passed along connections to other cells. The particular connections and component values determine the behavior of the network when some specified "input" cells are initialized to a set of values. The component values play roughly the same role in determining neural network behavior as a program does in determining the behavior of a computer.

Waltz and Pollack, in their article entitled "Massively Parallel Parsing: A Strongly Interactive Model of Natural Language Interpretation" in Cognitive Science, Vol. 9, pages 51–74 (1985), presented a neural network based model for word sense disambiguation using high level features which are associated with "micro-features". The system was implemented by running several iterations of spreading activation which would be computationally inefficient for medium-or large-scale systems. Cottrell, in the article entitled "Connectionist Parsing" from the Seventh Annual Conference of the Cognitive Science Society", Irvine, Calif. constructed a similar system as Waltz and Pollack, with the same practical limitations. Belew, in the article entitled "Adaptive Information Retrieval" from the Twelfth International Conference on Research and Development in Information Retrieval, Boston, June, 1989, has also constructed a document retrieval system based upon a "spreading activation" model, but again this system was impractical for medium or large-scale corpora. McClelland and Kawamoto, in the Rumelhart et al. books cited above, disclosed a sentence parsing method, including word sense disambiguation, using a model with a small number of orthogonal microfeatures.

An important related problem is the following. Given a collection of high-dimensional vectors (e.g. all vectors might have 200 components), find the closest vector to a newly presented vector. Of course all vectors can simply be searched one-by-one, but this takes much time for a large collection. An object of the current invention is to provide a process which makes such searches using much less work.

Although this problem is easily solved for very low dimensional (e.g., 2–4 dimensions) vector by K-D trees as described in Samet, H. The Design and Analysis of Spatial Data Structures, Addison-Wesley Publishing Company, 1990, K-D trees are useless for high dimensional nearest neighbor problems because they take more time than searching vectors one-by-one.

Prior art for document retrieval is well-summarized by the Salton reference cited above. Salton's SMART system us variable length lists of terms as a representation, but there is no meaning sensitivity between terms. Any pair of terms are either synonyms or are not synonyms; the closeness of "car" and "driver" is the same as that of "car" and "hippopotamus".

So called "vector space methods" can capture meaning sensitivity, but they require that the closeness of every pair of terms be known. For a typical full-scale system with over 100,000 terms, this would require about 5,000,000,000 relationships, an impractical amount of information to obtain and store. By contrast the present invention requires only one vector per word, or 100,000 vectors for such a typical full-scale system. This is easily stored, and computation of these vectors can be partly automated.

More recently Deerwester et al., in the article entitled "Indexing by Latent Semantic Analysis" in the Journal of the American Society for Information Science, Vol. 41(b), pages 391–407, 1990, have also proposed a method for searching which uses fixed length vectors. However, their method also requires work on the order of at least the square of the sum of the number of documents and the number of terms.

Bein and Smolensky, in the article "Application of the Interactive Activation Model to Document Retrieval" in the Proceedings for Neuro-Nimes, 1988: Neuro networks and their applications, November, 1988, have previously proposed a document retrieval model based upon neural networks that captures some meaning sensitivity. However, a search in their model requires multiplications for twice the product of the number of documents and the number of keywords for each of a plurality of cycles (they report 60). For large corpora, the present invention is expected to make searches up to 10,000 times faster.

Koll in "WEIRD: An Approach to Concept-Based Information Retrieval," *SIGIR Forum*, vol. 13, no. 4, Spring 1979, p. 32–50, discloses a retrieval method using vector representations in Euclidean space. The kernel or core used by Koll are non-overlapping documents. This results in rather small dimensional vectors on the order of seven values. Vectors are generated from the core documents based on whether or not a term appears in a document. As an alternative, Koll suggests starting with a kernel of terms which never co-occur.

SUMMARY OF THE INVENTION

The present invention is directed to a method for generating context vectors. The context vectors are used in a method for document storage and retrieval The storage and retrieval method may be similarly used for word sense disambiguation.

A context vector is a fixed length series of component values. These values may be representative of the conceptual relationship between a word-based feature and the word to which the vector is assigned. Alternatively, a dictionary of context vectors may be generated from an arbitrarily assigned set of vectors so as to result in relationship based vectors. This is done by the present invention using a corpus of training records. The vector values are generally determined by the proximity of words to one another in the training records.

Record storage according to the present invention is performed by inputting each record, which may be a document or a part of a document, in machine readable form into a processing system. It is sometimes advantageous to split a document into parts and treat each part as a record. Pictures may be searched by inputting records which are word based descriptions of the pictures. Uninteresting words are removed from consideration for the purposes of preparing an easily searchable data base. A context vector assigned to each word remaining in the record is identified from a dictionary of context vectors. A context vector is a fixed length series of component values. The context vectors are combined for all of the words remaining in the record to obtain a summary vector for that record. The summary vector is normalized so as to produce a normalized summary vector and this normalized summary vector is stored. Thus, the entire record has been reduced to a single normalized summary vector which is used to identify the records in a data base. Searching for an appropriate record is done through the data base of normalized summary vectors.

In order to further enhance the searching capabilities, a clustering algorithm is used repeatedly for a plurality of levels so as to produce a tree of clustered nodes. A centroid is computed for each node based on the normalized summary vectors assigned to that node by the clustering algorithm. Additional normalized summary vectors are assigned to nodes based on their proximity to the centroids. The bottom level of the tree are a series of buckets each containing the normalized summary vectors as assigned by the clustering algorithm.

Searching is performed by converting an inquiry into a query vector. The query vector is used for identifying the desired records for retrieval. The query vector is compared with the normalized summary vectors or with the centroids of a node to locate the closest normalized summary vector or group of closest normalized summary vectors. The search is conducted down through the tree taking the branch with the closest centroid. At the bottom level, each normalized summary vector in a bucket is checked to identify the closest one. A depth first tree walk is continued through the entire tree. An entire branch can be eliminated from the search if its centroid fails a test based upon the closest vector found so far and centroids of other nodes. By using the cluster trees, the closest normalized summary vector can be identified quickly without needing to examine every normalized summary vector in the data base.

The method of the present invention can also be used for word sense disambiguation. A series of words surrounding an ambiguous word in a text are input into a processing system in machine readable form. Uninteresting words are removed and a context vector is located for each of the remaining words. The context vectors are combined to obtain a summary vector for the series of words. Ambiguous words have a plurality of context vectors, one context vector for each of the meanings of the ambiguous word. The context vector closest to the summary vector is used to identify the appropriate meaning for the word.

By storing documents in the form of summary vectors in accordance with the present invention, searching for appropriate records is greatly simplified and matches to queries are improved. The cluster tree employing centroid consistent clustering gives an efficient way of finding nearest neighbor vectors in high-dimensional spaces. This has application in many schemes beyond the record searching embodiment described herein.

Other objects and advantages of the present invention will become apparent during the following description of the presently preferred embodiments of the invention taken in conjunction with the drawings.

BRIEF DESCRIPTION OF THE DRAWINGS

FIG. 4 is a flow chart of text preprocessing for use in the summary vector creation method of FIG. 3.

DETAILED DESCRIPTION OF THE PREFERRED EMBODIMENTS

Figure 1:
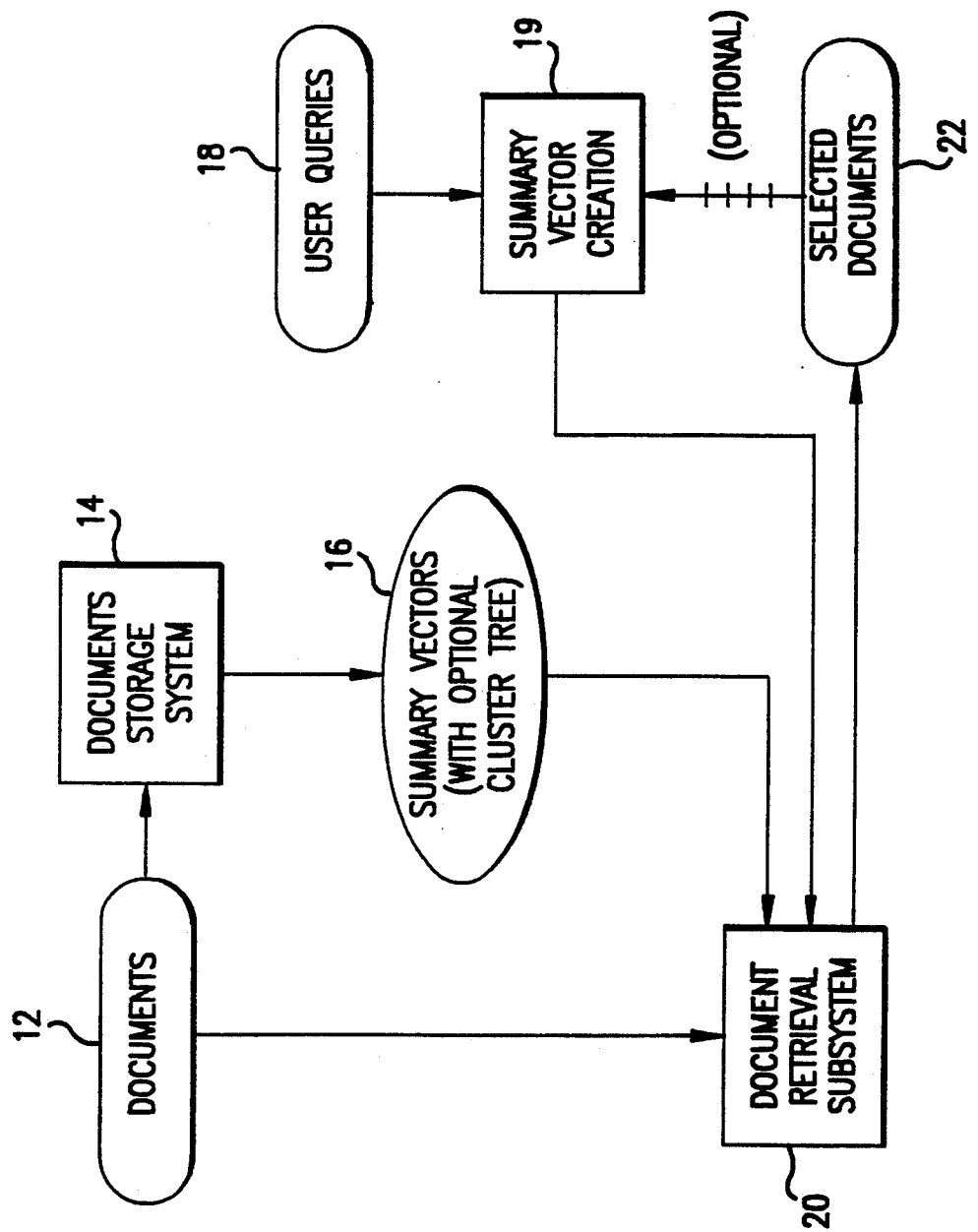
FIG. 1 is a flow chart of the record storage and retrieval system of the present invention.

The record storage and retrieval and word sense disambiguation methods of the present invention are based upon a representation scheme using context vectors. A context vector is a fixed length vector having a plurality of component values which are determined based upon a word's relationship to other invention, context vectors of between 150 and 500 component values be used. One method of generating context vectors involves directly determining relationships with a set of features. Features are selected that are useful for discriminating words and documents in a particular language and domain. A set of sample features are provided in table 1. The number and meaning of the features will be the same for all of the context vectors in a dictionary of context vectors for use in the present invention.

TABLE 1

| human | man | woman | machine | politics |
|---|---|---|---|---|
| art | science | play | sex | entertainment |
| walk | lie-down | motion | speak | yell |
| research | fun | sad | exciting | boring |
| friend | family | baby | country | hot |
| cold | hard | soft | sharp | heavy |
| light | big | small | red | black |
| white | blue | yellow | animal | mammal |
| insect | plant | tree | flower | bush |
| fruit | fragrant | stink | past | present |
| future | high | low | wood | plastic |
| paper | metal | building | house | factory |
| work | early | late | day | night |
| afternoon | morning | sunny | cloudy | rain |
| snow | hot | cold | humid | bright |
| smart | dumb | car | truck | bike |
| write | type | cook | eat | spicy |
| .... | | | | |

A system can be built using the specified features. Words sharing a common word stem may likewise share a common context vector. For example, "investments", "investor" and "investing" may all have the same context vector as "invest". Thus, only each word stem in a dictionary of words needs to have a context vector defined for it. It would be wasteful to create context vectors for all words. Uninteresting words such as "a," "an," "the," "or," "for," "not," "yes," etc. are removed from the dictionary. A context vector may be formed by setting each component value to a number indicative of the conceptual relationship between the word defined by the context vector and the specified feature. For simplicity, the values can be restricted to $+2, +1, 0, -1, -2$. A component is given a positive value if its feature is strongly associated with the word. 0 is used if the feature is not associated with the word. A negative value is used to indicate that the word contradicts the feature. As an example, using the features in table 1, the vector for "astronomer" might begin

| < | +2 | +1 | +1 | −1 | −1 |
|---|---|---|---|---|---|
| | 0 | +2 | 0 | 0 | 0 |
| | 0 | 0 | +1 | +1 | +1 |
| | +2 | +1 | −1 | +1 | −1 |
| | ... | ... | ... | ... | ... > |

Under such a representation, "car" and "automobile" are expected to be very similar, "car" and "driver" somewhat similar, and "car" and "hippopotamus" uncorrelated. This is the essence of the word-based meaning sensitivity of the current invention, and it extends to record and query representations as discussed below. It is noted that the interpretation of components of context vectors is similar to the interpretation of weights in neural networks.

It is contemplated that the dictionary of context vectors could be created by hand. Although, it is expected that such a task would be time consuming, once the task is completed it need not be completed again. Thus, the brute force method may be used in which for each word in the dictionary of context vectors, a component value is manually selected for each feature in the context vector for that word. This is repeated until the context vectors are finished for each of the words in the dictionary. By limiting the dictionary to word stems, much redundant effort can be avoided. Other possibilities for generating a dictionary of contexts using automatic methods are described below with respect to FIGS. 11-13.

As an option, context vectors may be lengthened to include random features in addition to the word-based features. For a random feature, the component values for each context vector are generated at random. The use of random features in context vectors will assist in keyword recognition. The more random features that are used, the more sensitive the system is to locating an actual search word. The fewer random features that are used, the more meaning-sensitive the system is. For example, without random features, a search for "car" and a search for "automobile" would have very similar results. But using random features, the two words would have vectors that are distinguishable by the random features and the searches would thus be more sensitive to appearance of the words themselves.

Referring now to the drawings, FIG. 1 illustrates the record storage and retrieval system of the present invention using the context vectors. The system is operated by a computer processing system. Records 12, which may be documents or portions of documents, are entered into the processing system in machine readable form. The record storage subsystem 14 converts the records into summary vectors 16 based upon the context vectors of the words in the record. The summary vectors 16 are stored for use in response to search requests. The record storage subsystem can be enhanced by arranging the summary vectors in accordance with a cluster tree. User queries 18 are converted to a vector for use by the retrieval system 20 in identifying responsive records from the data base. A user query 18 may also be augmented by submitting selected records 22 which are reduced to a summary vector such that the summary vector is then used as the query vector by the retrieval subsystem to obtain other records similar to the selected records.

Figure 2:
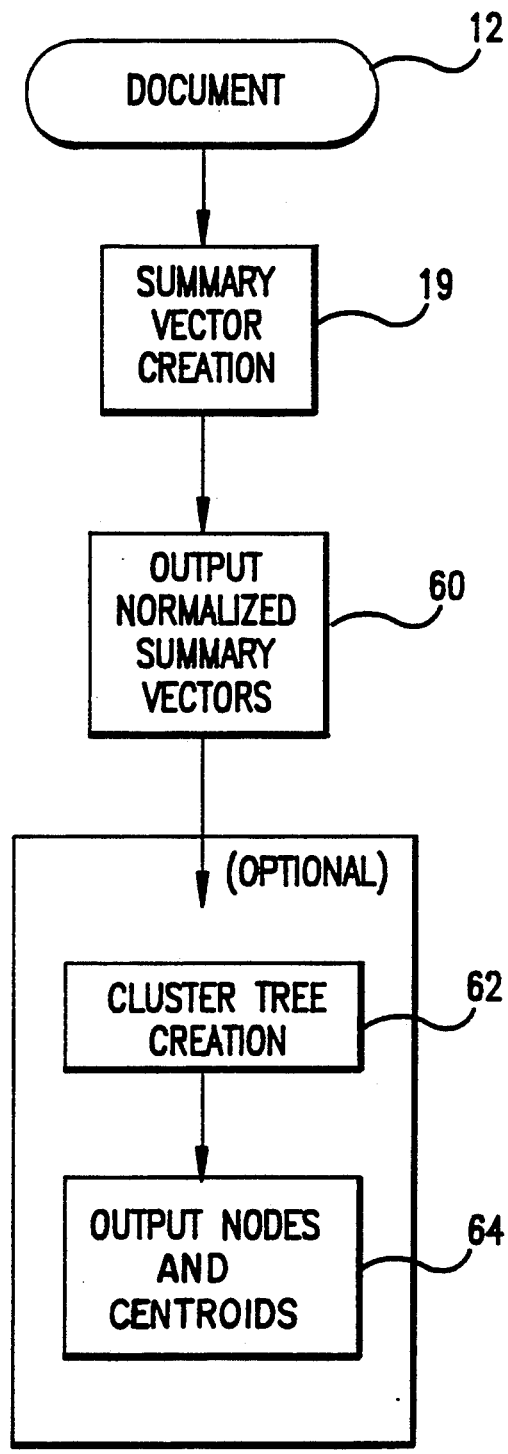
FIG. 2 is a flow chart of the record storage subsystem of FIG. 1.
Figure 3:
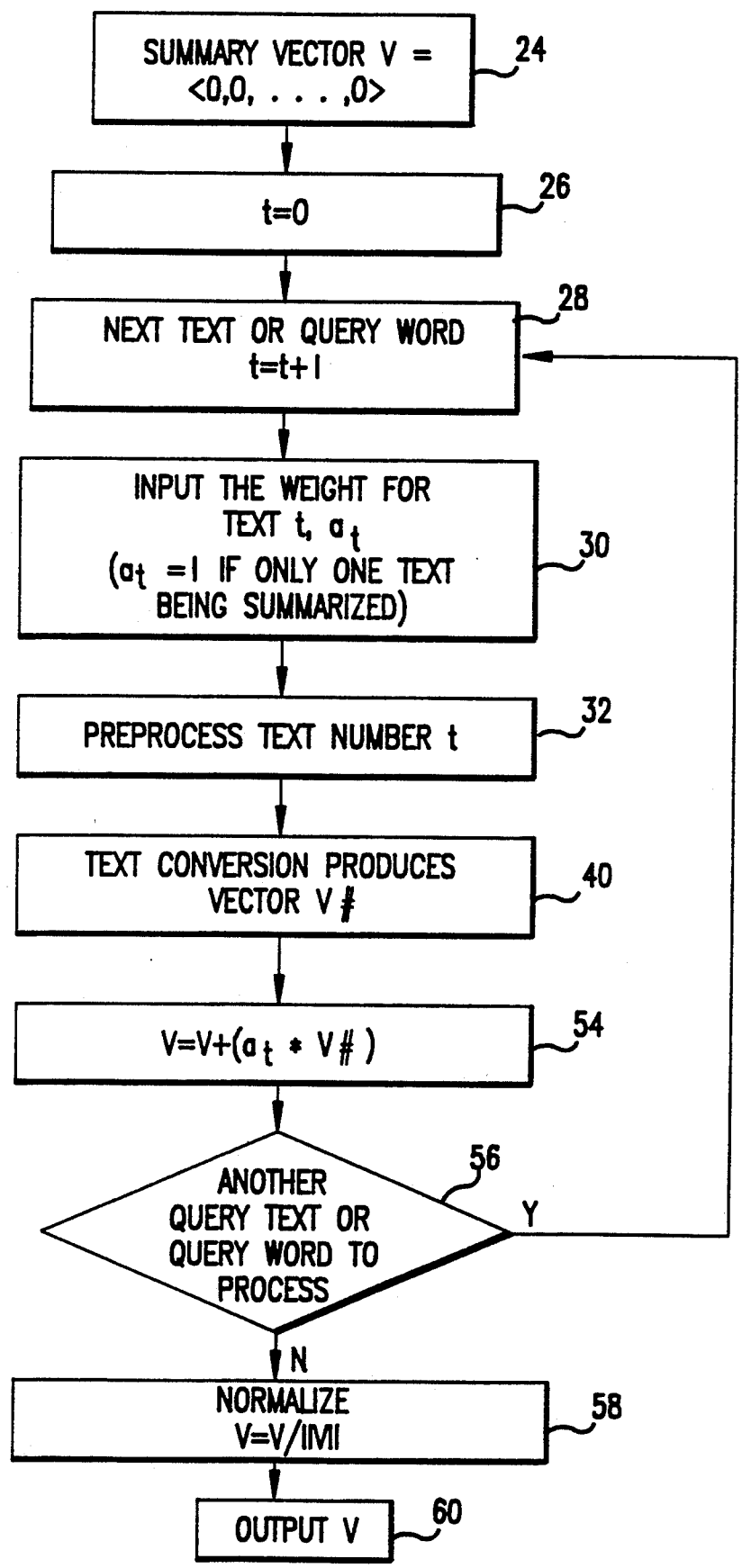
FIG. 3 is a flow chart of summary vector creation used in the record storage subsystem of FIG. 2

Referring now to the record storage subsystem of FIG. 2 and the summary vector creation method 19 of FIG. 3, a summary vector is generated for each record 12. A summary vector is a fixed length vector having a length equal to the number of features. This is the same length as the context vectors. It would, however, be possible to modify the system to include longer summary vectors with objective features. For example, a feature representative of the publication date for a record could be added and component values assigned according to within which range of dates the record was published.

The same process is performed for each record 12 in determining its summary vector. A summary vector of the fixed length is initiated 24 with all 0 component values. Summary vector creation may be done for a single record or in the case of a query based on a plurality of texts or words, the summary vector is representative of all of the texts or words used in the query. An index t is set 26 to zero and then incremented 28 to count through all of the texts or words used in a query. If several texts and/or words are being used to form a summary vector each of the texts and/or words may be given a different weight 30. When a summary vector is being created for a single record the weighting step is irrelevant. The weight of the single record would be made equal to 1 so that this step has no effect on the processing.

In order to eliminate uninteresting words such as common function words and in order to find word stems for the remaining words, the record is preprocessed 32 as shown in FIG. 4. Any common uninteresting words such as a, an, the, or, for, etc. are removed from consideration 34. The remaining words are reduced to their stems by stripping off suffixes 36. For example, "investments" becomes "invest". Any well known algorithm for reducing words to their stems may be used.

It may be possible to enhance the accuracy of the searching techniques by using additional processing on the records. For example, a parsing algorithm can be used to identify the subject, predicate and verb in each sentence. The subject and verb or the subject, verb and predicate can then be assigned 38 a greater weight than the other words in each sentence. Another method is to give the first 100 (or so) words in a record extra weight. Other methods of assigning weights 38 to words in a record may also be used. There are well known algorithms based on the frequency of use of a word in a record or in a series of records which may be used so as to assign a different weight to each of the remaining words in the record. For example, (1, p. 304) stem s in record d might be weighted by $$(tf(d,s)) (\log(N/df(s)))$$

where tf(d,s) is the number of appearances of stem s in record d;

N is the total number of records; and df(s) is the number of records in which stem s appears.

Figure 5:
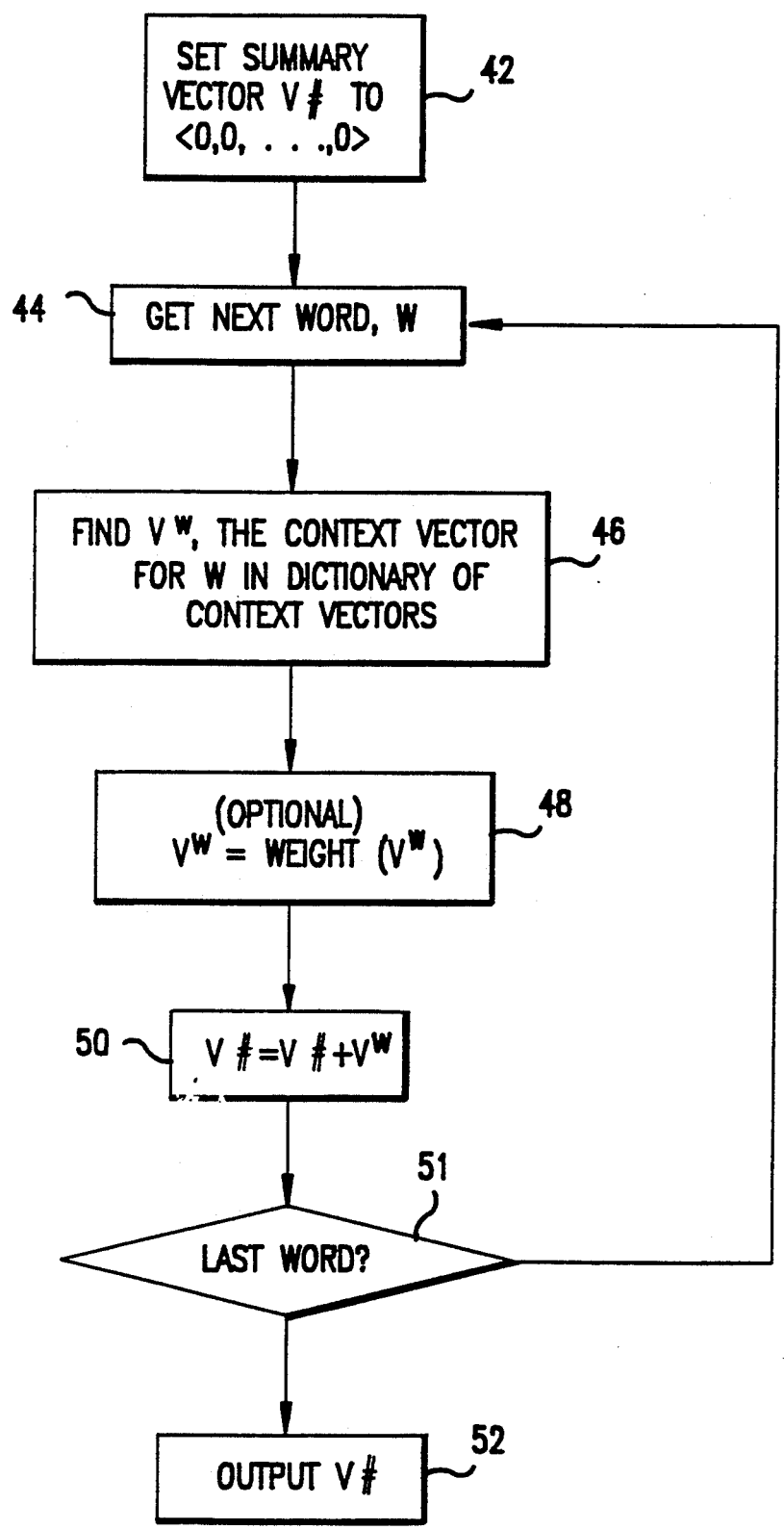
FIG. 5 is a flow chart of a text conversion method for use in the summary vector creation method of FIG. 3.
Figure 5:
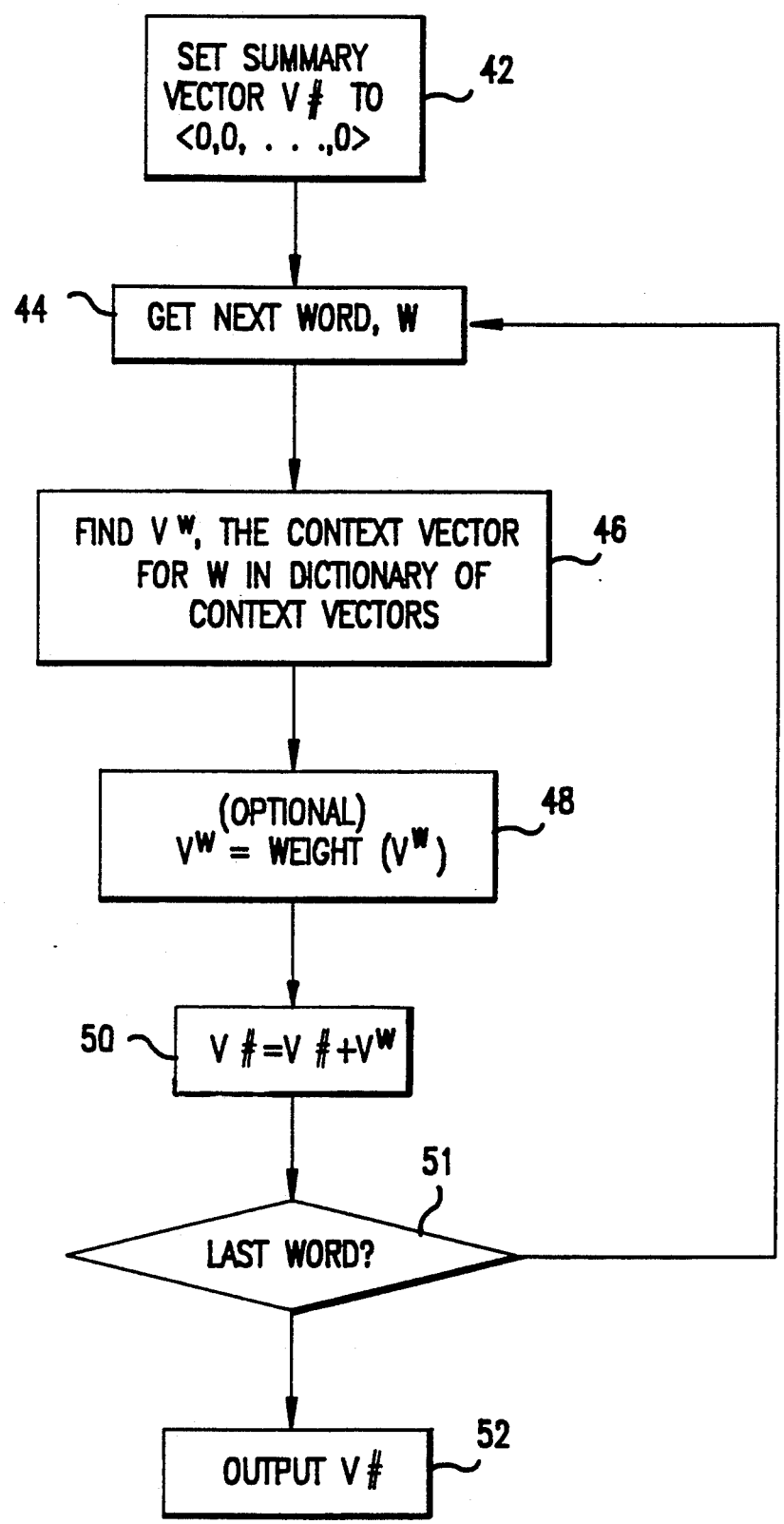

The preprocessed record may then be converted 40 into vector form as shown in FIG. 5 A summary vector is initialized 42 by setting all component values to 0. Each of the words remaining in the preprocessed text is considered one at a time 44. For each word, its associated context vector is located 46 one at a time in a dictionary of context vectors. The context vector for the word is multiplied 48 by the word's weight if weights were assigned 38 during preprocessing. This multiplication step 48 when used, produces weighted context vectors. The context vector or weighted context vector, as the case may be, is added 50 to the summary vector being formed for the record. For each feature in the vectors, the component value from the context vector of the word is added to the component value for the summary vector being formed. This results in a new summary vector for use with the next word in the record. After the context vectors for all of the remaining words to be considered in the record have been added, a gross summary vector 52 for the record is obtained.

Returning now to FIG. 3, if a summary vector is being determined for a plurality of records in a query, the gross summary vector obtained from a summation process can be multiplied by a weight and added to the summary query vector being formed 54. Summary vector creation may then take place for the next record 56 being used to form the query. When all the records being used in the formation of the summary vectors have been processed, the gross summary vector is completed.

The gross summary vector from the summation process is normalized 58. Normalization is performed by dividing each component value in the vector by the absolute magnitude of the vector. The magnitude of the vector is determined by taking the square root of the square of all of the component values in the vector. This results in a normalized summary vector. By providing normalized summary vectors, each record is given an equal weighting in a data base in which they are stored. The normalized summary vector is output 60 for storage. Thus, a data base is collected with a normalized summary vector for each record in the data base. Searches can be quickly conducted through the use of the normalized summary vector data base rather than requiring the exhaustive search through the entire contents of all the records.

Figure 6:
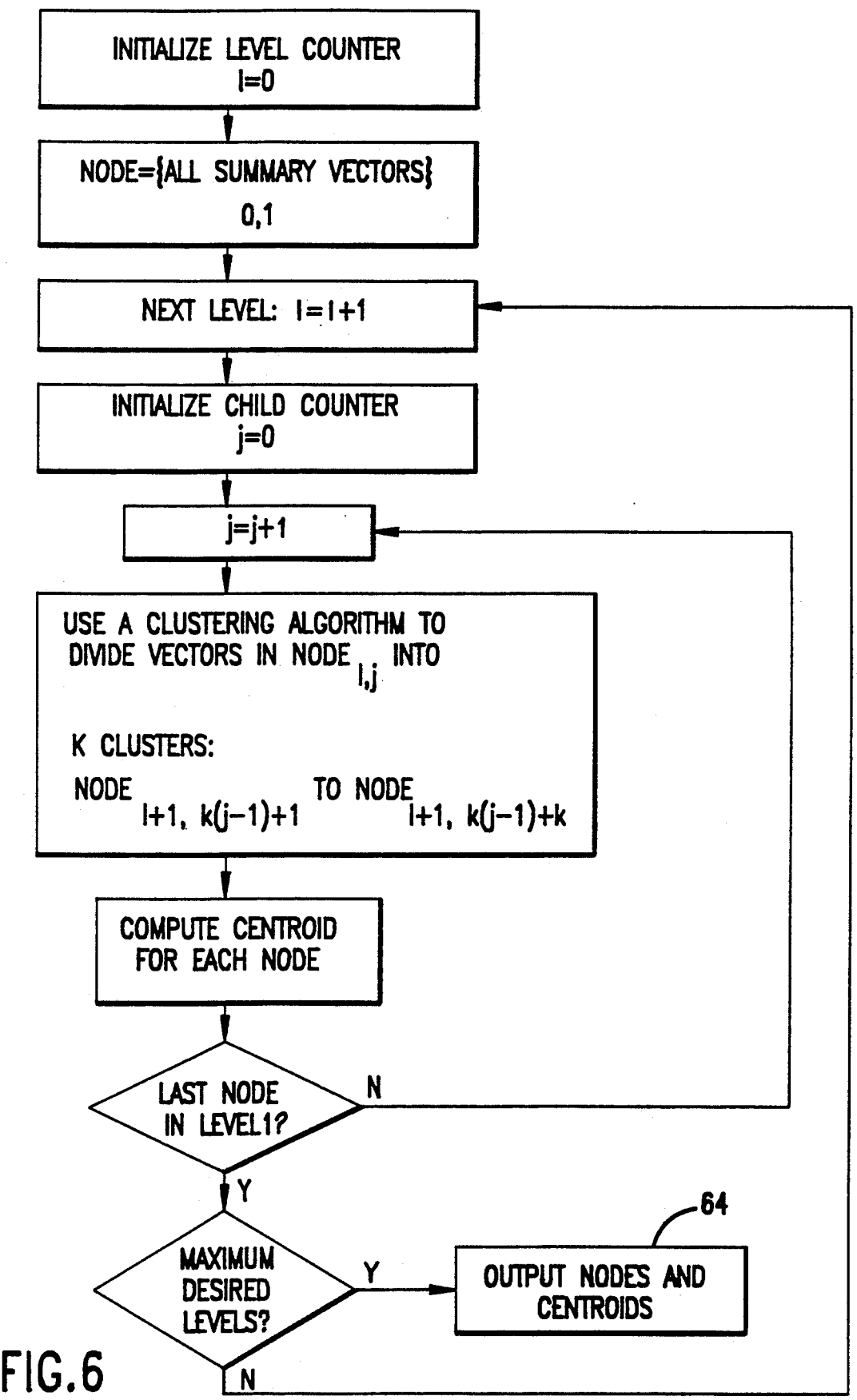
FIG. 6 is a flow chart of cluster tree creation for use in the record storage subsystem of FIG. 2.

As shown in FIG. 2, the storage of the normalized summary vectors can be arranged to further reduce searching time by creating cluster trees. Cluster tree formation 62 is described in greater detail with respect to FIG. 6. An initial parent node at the top of the tree indexed as level 0, node 1, contains all of the normalized summary vectors in the data base. A series of child nodes each branching from the initial parent node is created at a next level of the cluster tree. A centroid consistent clustering algorithm is used to divide the summary vectors among the series of nodes. A group of clusters is centroid consistent if every member of every cluster belongs to the cluster in the group with the closest centroid. A centroid is determined by taking, for each feature, the average of the component values from all of the context vectors in the group. One popular centroid consistent clustering algorithm is convergent k-means clustering described in MacQueen, J. B., Some methods for Classification and Analysis of Multivariate Observations, Proceedings Symp. Math. Statist. and Probability, 5th, University of California Press, Berkeley. Convergent k-means clustering can be performed as follows:

1. Begin with any initial partition that groups the vectors into k clusters. For example, take the first k summary vectors as single element clusters. Assign each of the remaining summary vectors with the cluster nearest centroid. After each assignment, recompute the centroid for the cluster which gains a vector;

2. Take each summary vector in sequence and compute its distance from the centroid of each of the k-clusters. If the vector is not currently in the cluster with the closest centroid switch the vector to that cluster and update the centroids of the clusters which gain or lose a summary vector;

3. Repeat step 2 until convergence is achieved, that is until a pass through all of the summary vectors causes no new assignments.

Since convergence may be rather time consuming to achieve, the clustering algorithm can be simplified by limiting the number of iterations through the algorithm. After say, 99 iterations of the algorithm, the centroids can be frozen. Then one more pass can be made through all of the summary vectors distributing the vectors to appropriate clusters, but without updating the centroids. While, using this approximation, the centroids will no longer be exact centroids, the approximate centroids will be sufficient for the use of the present invention. It is not necessary to the present invention that the centroids be precise but rather that the clusters be centroid consistent. The last pass through the summary vectors guarantees that the clusters are centroid consistent with the approximate centroids. From herein, "centroids" as used in this application shall mean approximate centroids. In other words, a centroid sufficient to establish centroid consistent clusters. Each node is identified by its centroid for use in the searching process.

In forming a next level of clusters, the nodes in the level above become parent nodes to a set of child nodes below. Only the summary vectors assigned to a parent node are used in the clustering algorithm to form the child nodes which branch from that parent. This is repeated across the entire level of parent nodes and on subsequent levels so that fewer and fewer context vectors are assigned to the child nodes on each lower level. The nodes form a tree pattern in which each node branches from a node in the level above. Thus, each summary vector is assigned to a node on each level of the cluster tree. Each node has a centroid. The bottom-level node assignments for each summary vector and the centroids for each node are stored for use in the search and retrieval algorithms. On the bottom level of the tree, each node points to each normalized summary vector assigned to it. The nodes on the bottom level may be referred to as buckets.

Once a cluster tree has been set up, it is a simple matter to add a new record summary vector to the tree. The initial branches of the tree are examined for the closest centroid. The summary vector is assigned to the node with the closest centroid. Then the branches from that node are examined for the closest child node centroid, and the process is continued until a bucket is reached. The new record is then assigned to the bucket with the closest centroid of those buckets branching from the node on the previous level to which the summary vector was assigned. The centroids themselves are not changed. This action preserves centroid consistency of the clusters. If a bucket gets too big, the summary vectors on the bucket can be divided into sub clusters on a subsequent level.

Figure 7:
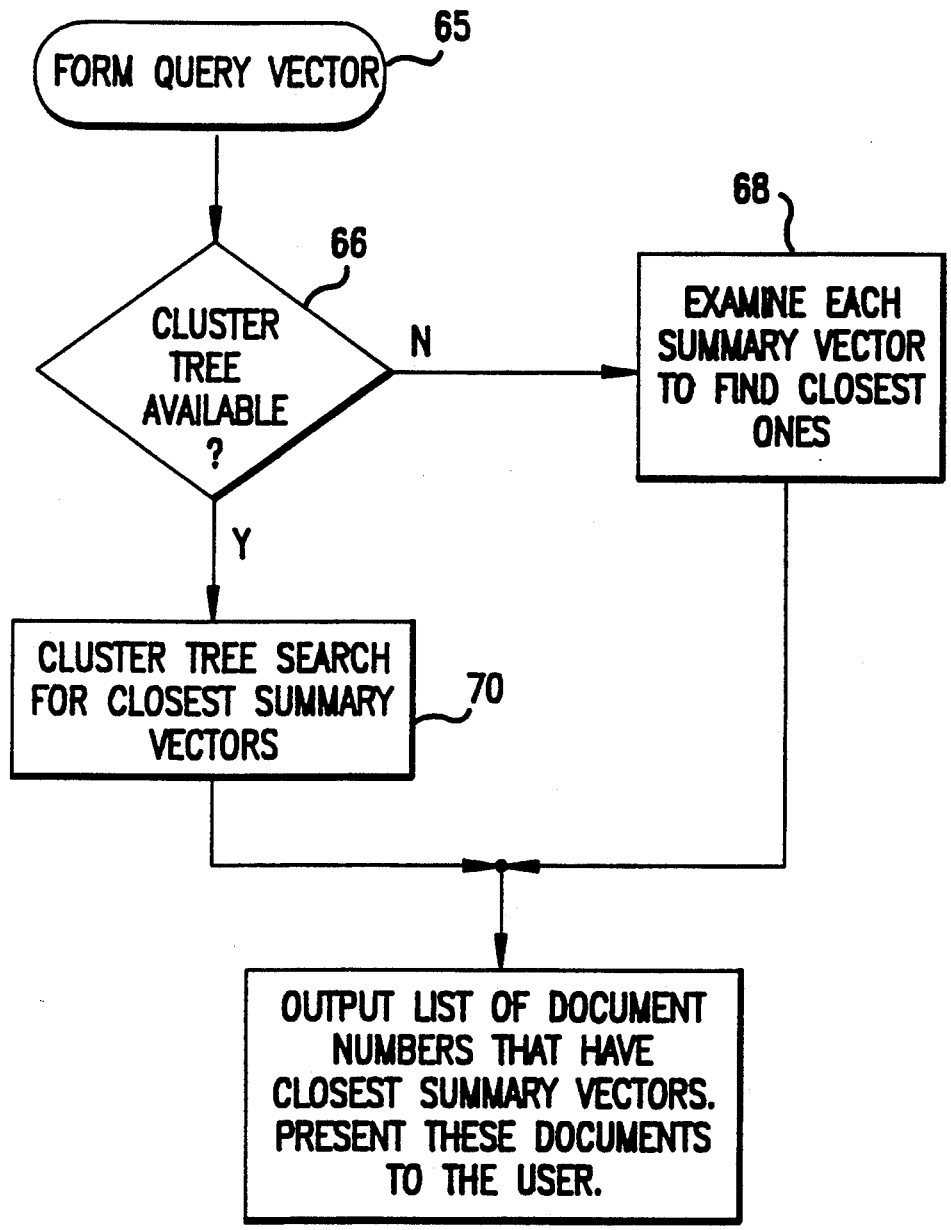
FIG. 7 is a flow chart of the record retrieval subsystem of FIG. 1.

Having stored all of the records as summary vectors in a data base, we now turn to the record retrieval system of FIG. 7. An inquiry can be made using a set of words or terms or by submitting one or more records for which similar records are sought or a mixture of records and words. Weights may be assigned for each of the terms or records in a query where such terms or records are considered to be more or less pertinent to the results sought in the search. In order to treat a term comprised of several words with the same weight as a single key word, the context vectors of the words comprising the term are added together and then normalized to produce a single normalized context vector for the term. The query vector is obtained by weighting and summing the summary vectors of the query words and texts as described above with respect to FIG. 3. It is not necessary to normalize 58 the query vector.

If the summary vectors in the data base are stored without the benefit of cluster trees 66, the query vector is compared with each summary vector in the data base in a brute force manner to identify the summary vector which is closest 68 to the query vector. The relative distance between a query vector and a summary vector can be determined by multiplying the query vector by a summary vector. Multiplication is performed by multiplying the component values for each feature together and summing the results. The result obtained can be compared with the magnitudes of the product vectors obtained with each of the summary vectors. The product vector with the maximum magnitude identifies the closest summary vector to the query vector. Alternatively, the relative distance between the summary vectors and a query vector can be determined by subtracting the query vector from each of the summary vectors. The magnitude of the difference vectors may then be used to identify the closest summary vector to the query vector. However, in this case it is the difference vector with the minimum magnitude which is the closest summary vector.

By using the cluster tree storage mechanism of the present invention, the searching task can be greatly accelerated. Searching through a cluster tree 70 for the closest summary vector to a query vector is described with respect to FIGS. 8 and 9. The query vector is used in the search routine of FIG. 9 to identify the summary vector that is closest to the query vector. The search is performed using a depth first tree walk. A branch is followed down the tree taking the node at each level having the centroid closest to the query vector. The search proceeds down the tree until a bottom level node (bucket) without children is reached 76. Each of the summary vectors in the bucket is compared with the query vector to identify the closest summary vector 78. The closest summary vector V is remembered and updated if during the search a closer summary vector is identified.

Before a subsequent node in the depth first tree walk is checked for a closest vector, first it is determined whether the node can be completely pruned. A node is pruned if it is not possible for a closer normalized summary vector to be assigned to the node than the closest normalized summary vector found so far without violating centroid consistency. Suppose we are examining a node with centroid C' for pruning. If C is the centroid of any sibling node then if it is true that any vector closer to the query vector Q than V (closest vector found so far) must be closer to C than C', then we may prune the node with centroid C' as well as any nodes branching therefrom. This may be computed by comparing 82 the distance between C and C' with twice the sum of the distance between C and Q and the distance between Q and V. If the distance between C and C' is greater, then the node with centroid C' (and descendents) may be pruned. If not, the formula is repeated for the remaining sibling nodes since any one of them may permit pruning to proceed. If none of the sibling nodes achieve pruning of the node, then the search continues through the node with centroid C' and down into the subsequent level if there is one. By using the pruning formula 82, a node can be pruned when any vector closer to the query vector than the closest vector V must be closer to the centroid C than to the centroid C'. Therefore, that vector could not be assigned to node C or else it would violate centroid consistency. If this is a bottom node, then all of the summary vectors on the node must be checked 78 to determine whether any are closer than the closest vector found so far. If a closer summary vector is found, it will then become the closest summary vector 80 being remembered. Thus, bottom nodes are thoroughly searched if not pruned. The search continues in a depth first tree walk pruning off entire branches when possible. These searches continue through the tree until all branches have either been checked or pruned. After the entire tree has been searched, the closest summary vector has been identified. The record associated with the summary vector can be retrieved.

The pruning formula given above provides for rough pruning of the tree. Greater pruning can be accomplished if more work is put into the pruning algorithm. When the simple pruning algorithm fails it may be desirable to use linear programming to attempt to prune the path. This would require additional computational time but it may be worthwhile for pruning a high level branch.

For a linear programming approach, we seek to find out whether the following set of constraints has a feasible solution. Suppose we are considering node N for pruning and V is the closest vector found so far. We check whether any vector V* can exist that satisfies:

1. For each node $N^1$ in the tree path from the initial parent node to N, it must be that V* is closer to the centroid for $N^1$ than to the centroid for any other sibling node of $N^1$; and 2. The distance between $V^Q$ and V* is less than the distance between $V^Q$ and V.

These constraints can be formulated as a linear programming problem by one skilled in that art. If such problem is found to be infeasible (i.e., admit no solution) then node N and descendents may be pruned.

Figure 8:
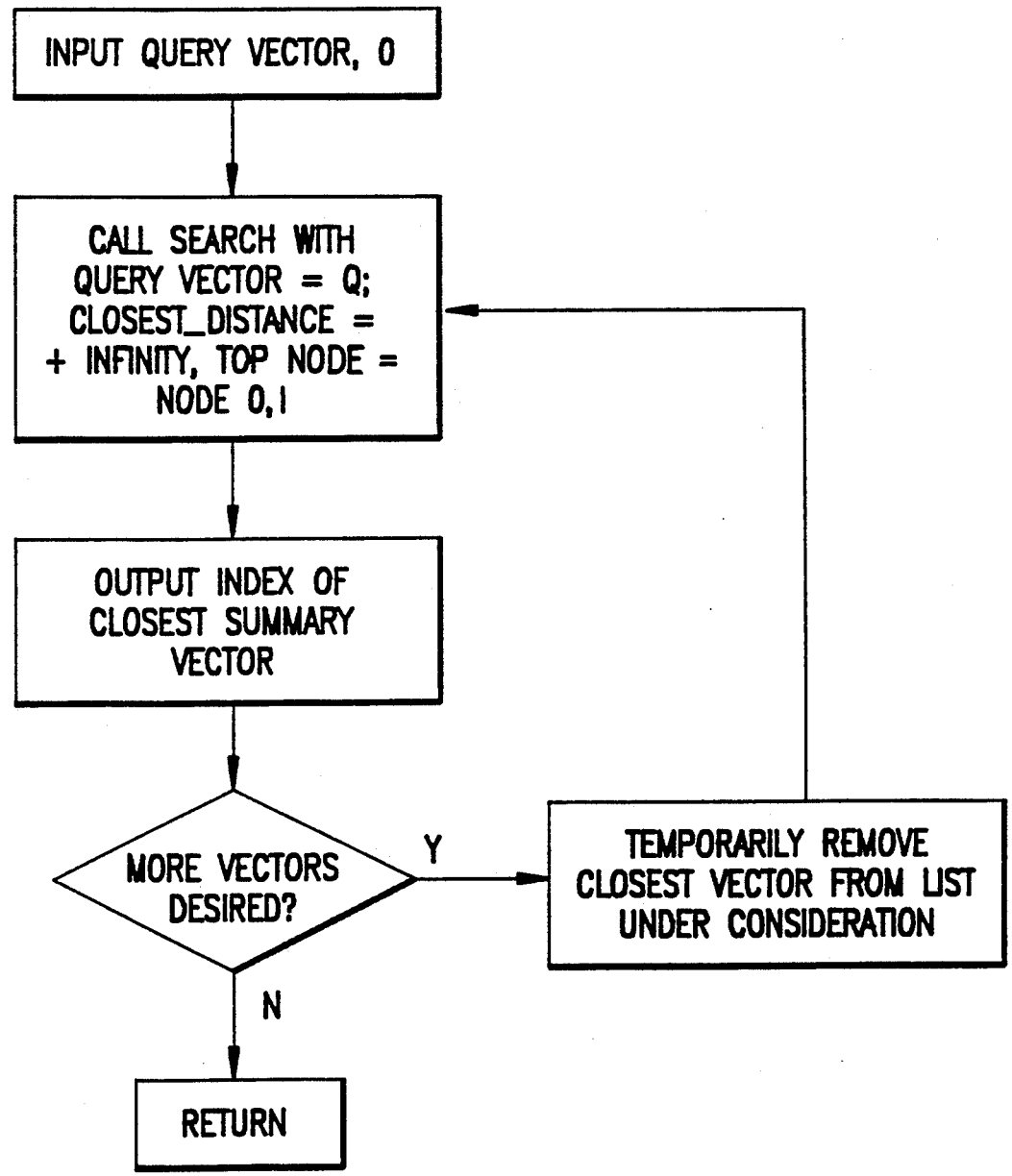
FIG. 8 is a flow chart of a cluster tree search for use in the record retrieval system of FIG. 7.
Figure 9:
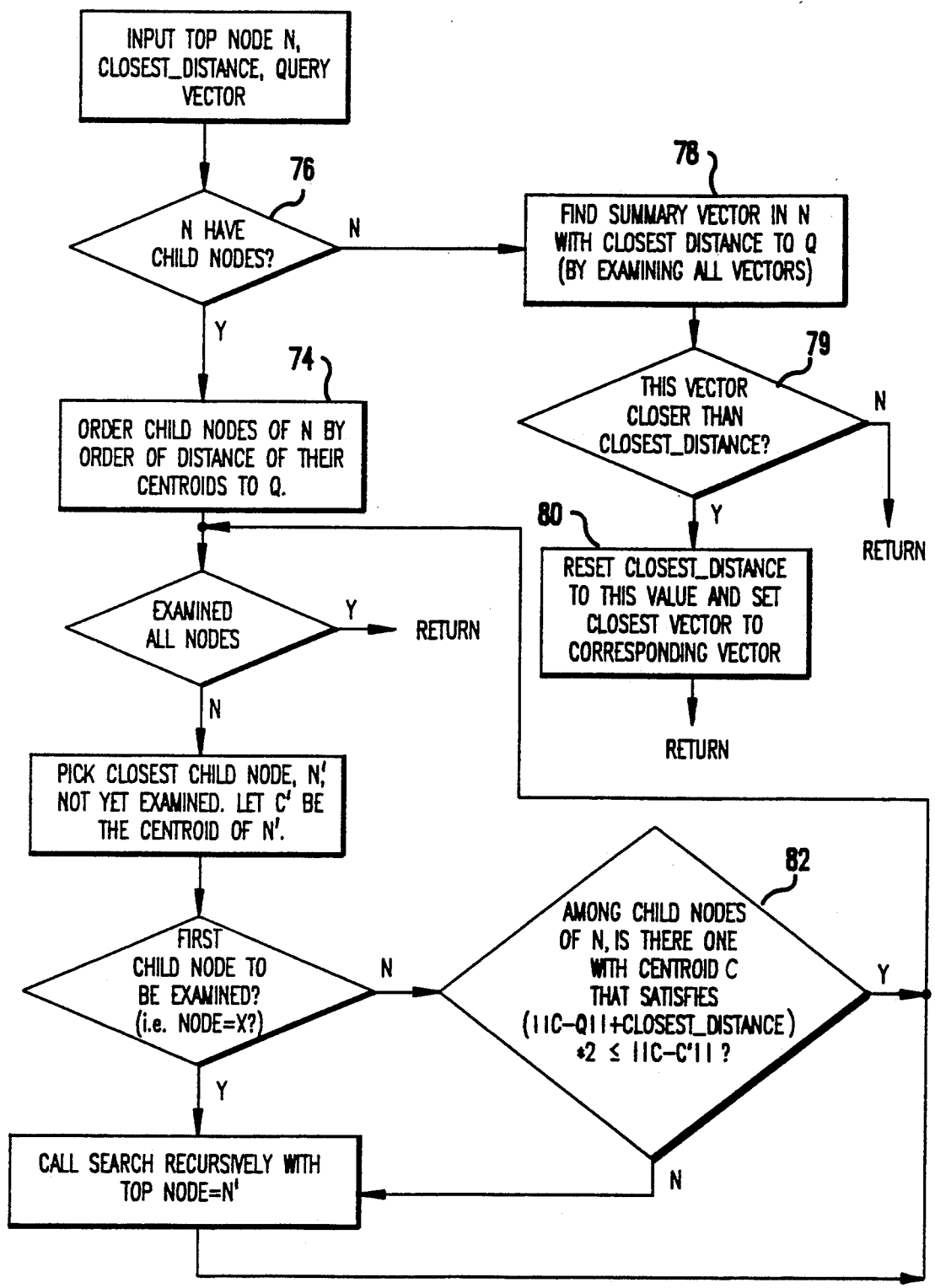
FIG. 9 is a flow chart of a search subroutine for use in the cluster tree search of FIG. 8.

As shown in FIG. 8, after the closest summary vector is found, it may be removed from consideration and the search repeated to find the next closest summary vector. This process may be repeated for as many summary vectors as are required.

Figure 10:
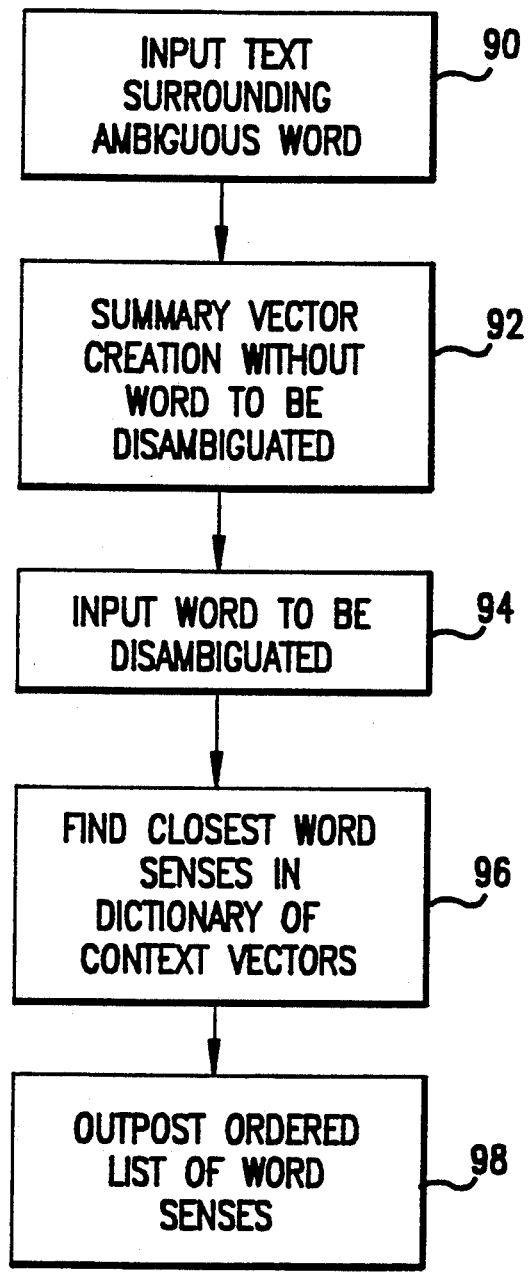
FIG. 10 is a flow chart for word sense disambiguation using the summary vector creation method of FIG. 3.

Referring now to FIG. 10, the present invention is shown for use in achieving word sense disambiguation. The text surrounding an ambiguous word is input into 90 the processing system. A summary vector is then created 92 for the text surrounding the ambiguous word. Summary vector creation was described with reference to FIG. 3. Weights may be assigned to each of the words in the series of words. One weighting mechanism would be to give the greatest weight to words which are closest to the ambiguous word in the text. Uninteresting words are removed from the series and the remaining words except for the ambiguous word are located in the dictionary of context vectors. The context vector for each of the remaining words is multiplied by its weight so as to produce a weighted context vector for each of the remaining words. For each of the remaining words being considered in the text surrounding the ambiguous word, the weighted context vectors are summed together. The sum of all of the weighted context vectors is the summary vector for the series of words. The normalization step is not necessary for word sense disambiguations.

The word being disambiguated is then considered 94. The dictionary of context vectors contains a different context vector for each of the different meanings which could be applied to the ambiguous word. The plurality of context vectors associated with the ambiguous word ar retrieved from the dictionary of context vectors. The summary vector obtained from the surrounding text is then compared 96 with each of the context vectors associated with the ambiguous word. The relative distances between the summary vector and each of the context vectors can be determined by multiplying the vectors together or from subtracting the vectors from each other. The context vector which is determined to be closest to the summary vector of the surrounding text is identified as the appropriate meaning for the ambiguous word. If there are more than two possible meanings for the word, these can be ordered 98 according to their relative closeness to the summary vector for the surrounding text. The appropriate meaning can be output for the processing system.

The foundation for the workings for the present invention is the dictionary of context vectors. Generation of feature based context vectors can be partially automated. For each of the features making up all the features of the context vector an integer should be entered according to how that feature correlates, suggests and is consistent with the word stem for which the context vector is being formed. For example, a scale of from −5 to +5 may be used. It may be further advantageous to normalize the context vectors in the dictionary so that the average squared weight is the same for each feature. Alternatively, normalization may be performed for each word so that the average squared weight is the same for each word in the dictionary.

Figure 11:
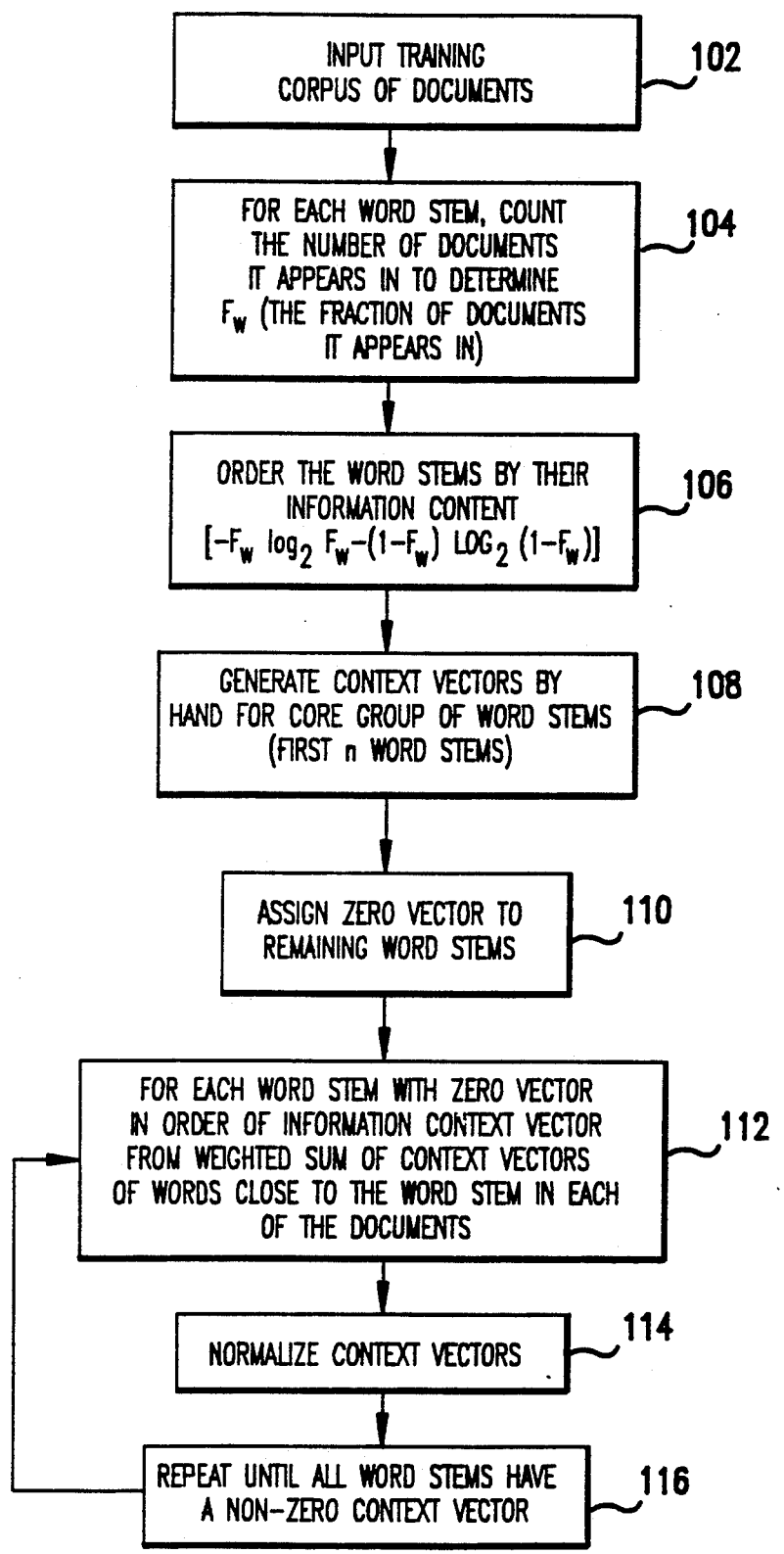
FIG. 11 is a flow chart for the creation of a dictionary of context vectors for use in the record storage and retrieval system of the present invention.
Figure 12:
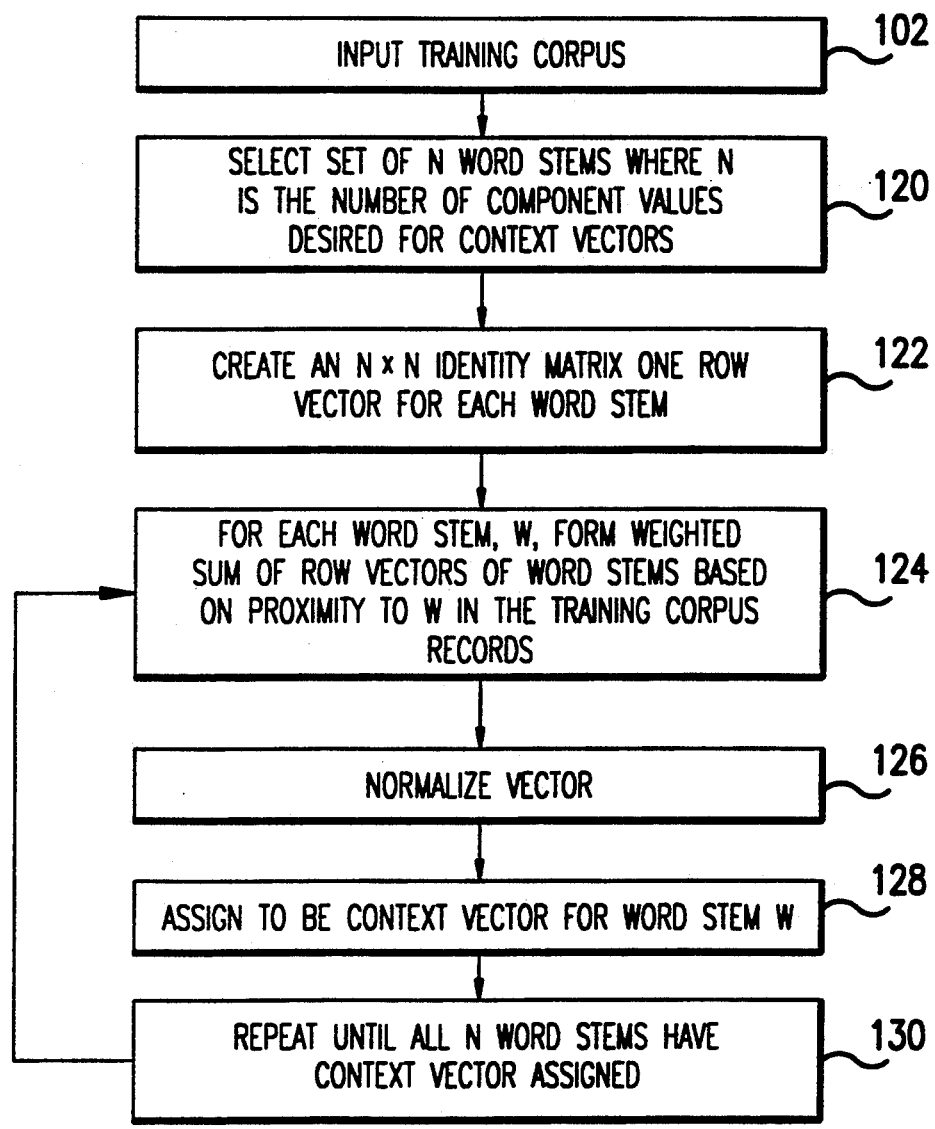
FIG. 12 is a flow chart for the creation of a core group of context vectors for use in the dictionary creation methods of FIGS. 11 or 13.

An automated method for building a dictionary of context vectors can be achieved with the aid of a training corpus 102, i.e., an initial set of records, as shown in FIG. 11. For each word stem, the number of records which the word stem appears in are counted 104. We let $F_w$ be the fraction of training corpus records in which the word stem w appears. All of the word stems can then be ordered 106 by their information content which is defined by the equation:

$$-F_w \log_2 F_w - (1-F_w)\log_2(1-F_w)$$

It is seen from this equation that words appearing in half of the records have the highest information content while those appearing in either all or none of the documents have the lowest content.

A core group of word stems are taken from the list. In accordance with a preferred method, word stems having the highest information content are taken from the top of the list. For example, the first 1,000 word stems having the highest information content may be selected. For the core group of word stems however selected, context vectors may be generated by hand 108. Temporarily a zero (0) vector is assigned to any other word stems remaining 110. A word stem w which has temporarily been assigned a zero (0) vector is then taken. The word stem with the highest information content is selected in a preferred method. For this word stem, the context vectors of word stems that are close to w in the training corpus records are weighted by their distance from w. For example, the 10 stems preceding and following each occurrence of the word stem may be used. The weighted context vectors are added up to produce a context vector for the word stem 112. The context vector can then be normalized 114. The resulting context vector becomes w's permanent context vector. The next word stem w from those word stems which have only a temporary 0 vector is then selected and the process is repeated 116. It is recommended that at least 1000 records be used. Once the dictionary of context vectors is completed, the invention may be used to its full benefit. For such automatic dictionary building, multiple meanings of a word do not enter in; all stems have only one context vector.

In accordance with the present invention, it is possible to use context vectors which, rather than being based on particular features, are automatically generated so as to nevertheless be relationship based. Thus, the step of manually associating the words with a feature and providing the pertinent component values can be eliminated. Instead of performing steps 104-108 in FIG. 11, the algorithm for generating a core group of context vectors in FIG. 12 may be used. As before, a training corpus of records is input into the system 102. A core group of n word stems is selected 120 as the core group. The word stems may be selected on the basis of their information content as discussed above with respect to step 106 or they may be selected at random. In accordance with the presently preferred embodiment, the number of word stems selected for the core group is equal to the number of component values which will be provided for each context vector.

Each word stem in the core group is then given a vector which is different from any other vector in the group. In accordance with the preferred embodiment, an n×n identity matrix is formed 122 in which each row is the vector for a word stem. Thus, the initial row vector for each word stem will be a series of 0's and a 1 in the column corresponding to the row in which the vector is located. Then for each word stem in the core group, one at a time, a weighted sum of the row vectors of the word stems that are close to the word stem w being worked on in the training corpus of records is formed 124. Thus, for each occurrence of the word stem w in a record, those word stems that are also located in the record may be weighted in accordance with their proximity to the word stem w. The weighted row vectors thus obtained are summed for all of the records in the corpus. Alternatively rather than weighting all of the word stems in a record along with the word stem w, the ten (or other predetermined number) closest stems preceding and following the occurrence of the word stem w may be used.

In accordance with the presently preferred weighting method, nine (9) word stems are taken from each side of the word stem w. If any of these word stems are identical to word stem w they can be left out of the computation. Indeed, only the core group word stems with assigned row vectors are used in the computation. When two occurences of word stem w are close to one another, the nine word stems on either side may overlap. In this case, their row vectors will be weighted and summed twice. The preferred weighting scheme is to multiply a word row vector by $\eta$ (distance/3), where $\eta$ (x) is the probability density function for the normal distribution at a distance of x standard deviations from the mean. The normal distribution is the well-known Gaussian bell curve. Every three word stems away is treated as a standard deviation. Thus, for example, the row vector for a word that is six word stems away from word stem w is multiplied by the value of the normal distribution at two standard deviations. The weighted row vectors are summed to obtain a sum vector.

The sum vector just obtained is normalized 126 so that all vectors being formed will have the same total weight. The normalized vector is assigned as the context vector for the word stem w 128. Forming the weighted sum of row vectors is repeated 130 for each word stem using the original row vectors to compute the context vectors. Even if a word stem has been assigned a context vector, its original row vector is used in the computation. Alternatively, it would be possible to use the context vectors as they are assigned, however, in this case it may be advisable to go through the process at least a second time for each core group word stem so that all of the core context vectors may be based on vectors generated by the system rather than having some predominantly based on the original row vectors and others based more on the generated context vectors.

After all of the word stems in the core group have been assigned context vectors, the core group of context vectors may be used in the dictionary building algorithm of FIG. 11. In this manner, a dictionary of context vectors is built using entirely automatic methods. Using this method of generating core group context vectors with an identity matrix, the original core group of word stems forms the features associated with each component value in the context vectors for the entire dictionary. A more random method of assigning the initial row vectors might be used but in that case, a feature may not be readily identified for each component value. In any case, the method of the present invention generates a context vector which is relationship based as it is grounded upon the proximity of words to one another in a training corpus of records.

Figure 13:
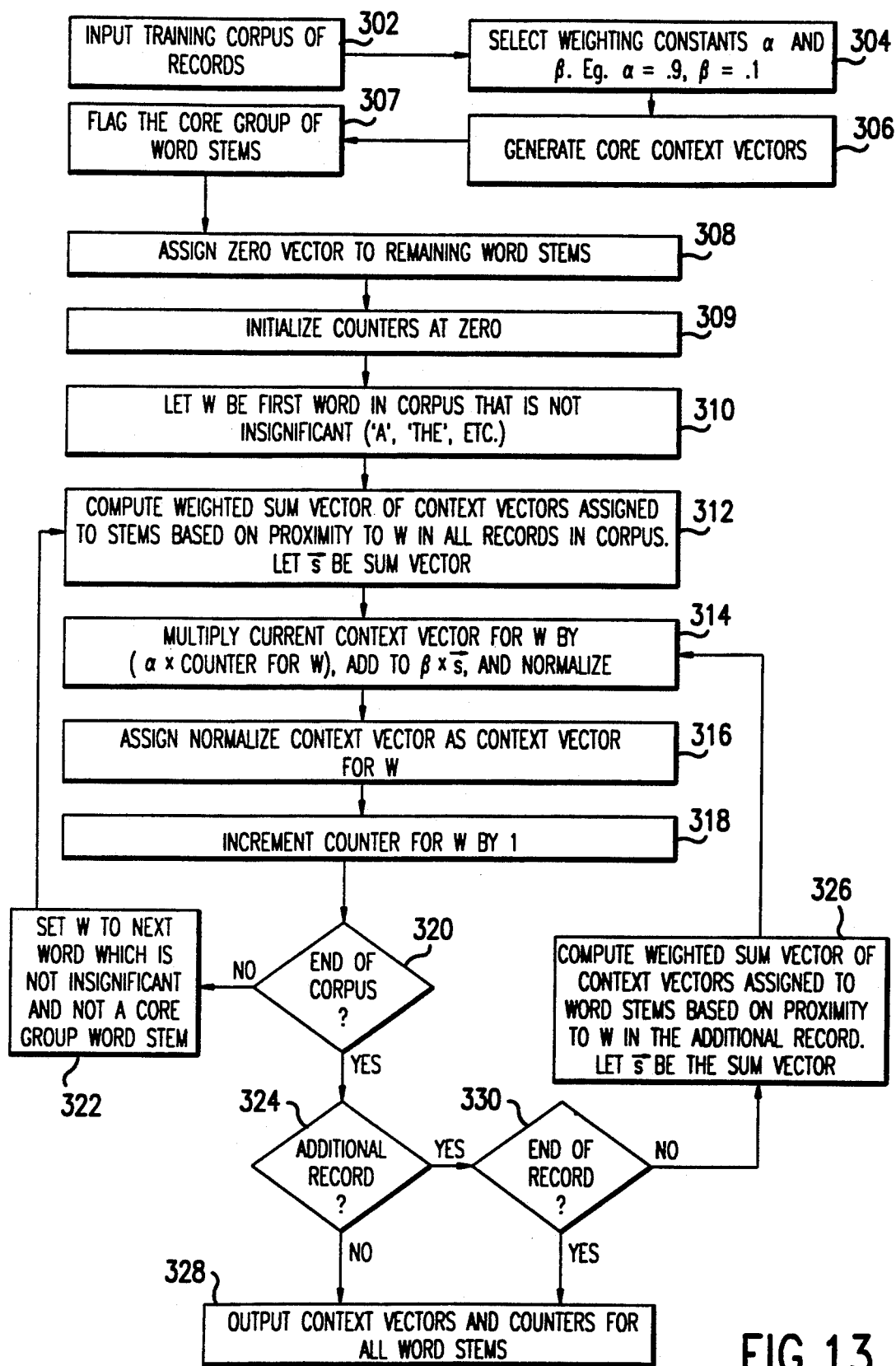
FIG. 13 is a flow chart of a dynamic method for creating and revising a dictionary of context vectors for use in the record storage and retrieval system of the present invention.

It may be desirable in certain applications to provide a dynamic method for repeatedly revising the context vectors in a dictionary. Referring now to FIG. 13, a dynamic system begins by inputting a training corpus of records 302 as is done in the other methods described above. Dynamic weighting constants are selected 304 for use in this system. $\alpha$ is given as a weight assigned to the previously established context vector and $\beta$ is the weight assigned to a newly derived sum vector to be combined with the previously determined context vector. In accordance with the presently preferred embodiment, the previously derived context vector is given a greater weight of 0.9 while the newly derived sum vector is given a $\beta$ of 0.1.

A core group of context vectors is generated 306. This may be accomplished using manual entry of component values based on relationships between the word stem and the features or by the automatic method of FIG. 12. Each word stem in the core group is flagged 307 so that the core group word stems can be readily identified by the system. A zero vector is temporarily assigned 308 to all the remaining word stems found in the corpus of records. Each remaining word stem has a counter associated with it for keeping track of the number of times that the word stem appears in the records in the system. As records are added to the system the counters are revised. If the system also revises context vectors for the core group word stems, these too would have counters associated therewith. The counters are initialized at zero 309.

The system ignores insignificant words in the records. Words such as "a," "the," "or," "on," "not," "no." "yes," etc. have no value in searching and are thus identified for exclusion from the context vector dictionary. The word stems are reviewed as they appear in the corpus of records. For each word stem in the corpus of training records, except for the flagged core group, a weighted sum vector is computed from the context vectors assigned to word stems based on their proximity in each record to the word stem being worked on 312. Various methods for computing this weighted sum vector are discussed above with respect to step 124. As discussed above, the preferred weighting is to take nine (9) word stems on each side of the word stem being worked on and multiplying their corresponding context vectors by $\eta$ (distance/3).

The weighted sum vector is then combined 314 with the existing context vector assigned to the word stem being worked on. The first time the word stem is encountered in the corpus its current context vector will be zero. However, in subsequent iterations component values will be assigned to the context vector for the word stem and these may vary as the context vectors vary for the word stems in the training corpus as this process progresses through the word stems in the corpus. To combine the current context vector with the new sum vector, the current context vector for the word stem is multiplied by $\alpha$ times the counter value for the word stem and this resulting vector is then added to the product of $\beta$ times the just computed weighted sum vector. The resulting vector is then normalized. The normalized context vector is assigned 316 to the word stem and its associated counter is incremented 318 by one. The process of assigning and revising the context vectors continues throughout all of the significant word stems in the corpus of records. The process is completed after passing through the process for the last occurrence of a significant word stem in the corpus.

After all word stems in the corpus of training records have been assigned context vectors, a dynamic revision of the context vectors can be made when an additional record is added to the system. It is presently preferred that the core group of word stems maintain their originally provided context vectors. However, a dynamic system of the present invention could be implemented in which the core group of word stems as well as any remaining word stems are all available for updating in the dynamic system.

When a record is added to the system 324, a weighted sum vector is computed 326 based upon the context vectors corresponding to word stems and their proximity in the new record to the word stem being worked on. The sum vector obtained from the new record is multiplied by $\beta$ and added to the existing context vector which is multiplied by $\alpha$ times the value of the counter for the word stem 314. The resulting vector is normalized and then assigned 316 to the word stem as the revised context vector. The counter is incremented 318 for the word stem. Each time the word stem appears in the new record the process is followed revising the context vector and incrementing its counter. Each of the word stems in the new record is processed 330 through the dynamic context vector generator. After each word stem has been processed, the current value of the context vectors can be output 328 along with the associated counters for use in the storage and retrieval methods.

When using the dynamic updating of the context vectors, the summary vectors for records may not always be based upon the latest context vectors. If desired, the summary vectors for the records may be updated at periodic intervals to fine tune the storage and retrieval system.

Of course, it should be understood that various changes and modifications to the preferred embodiments described above will be apparent to those skilled in the art. For example, numerous weighting schemes, parsing algorithms, clustering algorithms or methods for creating a context vector dictionary are possible within the scope of the present invention. Furthermore, systems may be constructed within the invention with varying definitions of what constitutes a word, a word stem or a significant word. Indeed, the invention could be performed without word stemming and every significant word can be treated as a word stem. These and other changes can be made without departing from the spirit and scope of the invention and without diminishing its attendant advantages. It is therefore intended that such changes and modifications be covered by the following claims.

APPENDIX (1) Salton, G. Automatic text processing: The transformation, analysis, and retrieval of information by computer. Reading Ma.: Addison-Wesley, 1989.
(2) Rumelhart, D. E. & McClelland, J. L. (Eds.) Parallel Distributed Processing: Explorations in the Microstructures of Congntion, Vol. 1 and Vol. 2 MIT Press 1986.
(3) Anderson, J. A. and Rosenfeld, E. (eds). Neurocomputing, A reader, MIT Press, 1988.
(4) Hecht-Nielson, Neurocomputing. Reading Ma.: Addison-Wesley, 1990.
(5) Waltz, D. L. & Pollack, J., Massively Parallel Parsing: A Strongly Interactive Model of Natural Language Interpretation. Cognitive Science 9, 51–74 (1985).
(6) Cottrell, G. W. Connectionist Parsing, Seventh Annual Conference of the Cognitive Science Society, Irvine, CA.
(7) Belew, R. K., Adaptive Information Retrieval. 12th International Conference on Research & Development in Information Retrieval. Boston, June, 1989.
(8) Samet, H. The Design and Analysis of Spatial Data Structures. Reading, Ma: Addison-Wesley Publishing Company, 1990.
(9) Deerwester, S., Dumais, S. T., Furnas, G. W., Landauer, T. K., Harshman,, R. Indexing by Latent Semantic Analysis, Journal of the American Society for Info. Science, 41(b):391–407, 1990.
(10) Bein, J. & Smolensky, P. (1988). Application of the interactive activation model to document retrieval. Proceedings of Neuro-Nimes 1988: Neural networks and their applications. Nimes, France, November 395-308.
(11) MacQueen, J. B. Some Methods for Classification and Analysis of Multivariate Observations. Proc. Symp. Math. Statist. and Probability, 5th, Berkeley, 1, 281–297, AD 669871, University of California Press, Berkeley.

I claim:

1. A method for generating a dictionary of context vectors comprising:
   providing a corpus of records, each including a series of words wherein each word corresponds to one of a plurality of word stems;
   generating a context vector for each of a core group of word stems;
   temporarily assigning a zero context vector to the remaining word stems in said plurality of word stems that are not in said core group;
   for each word stem with a zero vector, combining context vectors based on proximity in each of said series of words between the word corresponding to said word stem and the words corresponding to said context vectors to generate a context vector for said word stem.

2. The method of claim 1 wherein said step of combining comprises assigning weights to the words appearing in a record with the words corresponding to said each word stem based on relative proximity between each other, multiplying the context vectors of said words appearing in a record by said weights to form weighted context vectors and summing said weighted context vectors.

3. The method of claim 2 further comprising normalizing said sum of weighted context vectors.

4. The method of claim 1 wherein said step of generating context vectors for each word stem of a core group of word stems comprises selecting a series of features and assigning component values based on conceptual relationships between said word stem and said features.

5. The method of claim 1 wherein said step of generating context vectors for each word stem of a core group of word stems comprises assigning a different initial vector to each of said word stems, assigning weights to the context vectors corresponding to words appearing in a record with the word corresponding to said each word stem based on relative proximity, multiplying the context vectors of said words by said weights to form weighted context vectors, summing said weighted context vectors, normalizing the sum of said weighted context vectors and assigning the normalized context vector as the context vector for said each word stem.

6. The method of claim 5 wherein said different initial vectors are each a different row from an identity matrix.

7. The method of claim 1 wherein said step of generating context vectors for each word stem of a core group of word stems comprises assigning a different initial vector to each of said word stems, summing the context vectors corresponding to words appearing within a predetermined number of words from words corresponding to said each word stem in said corpus of records, normalizing the sum of said context vectors and assigning the normalized context vector as the context vector for said each word stem.

8. The method of claim 7 further comprising the step of weighting, before summing, the context vectors corresponding to words appearing within a predetermined number of words from words corresponding to said each word stem in said corpus of records according to relative proximity between said words appearing within a predetermined number of words and said words corresponding to said each word stem.

9. The method of claim 1 wherein said step of combining comprises summing the context vectors corresponding to words appearing within a predetermined number of words from words corresponding to said each word stem in said corpus of records, normalizing the sum of said context vectors and assigning the normalized context vector as the context vector for said each word stem.

10. The method of claim 9 further comprising the step of weighting, before summing, the context vectors corresponding to words appearing within a predetermined number of words from words corresponding to said each word stem in said corpus of records according to relative proximity between said words appearing within a predetermined number of words and said words corresponding to said each word stem.

11. A method for generating a core group of context vectors comprising
providing a corpus of records, each including a series of words wherein each word corresponds to one of a plurality of word stems;
selecting a core group of word stems from said plurality of word stems;
assigning a different vector to each word stem in said core group of word stems; for each word stem in said core group, combining the different vectors based on proximity in each of said series of words between the word corresponding to said each word stem and the words corresponding to said different vectors to generate a context vector for said each word stem.

12. The method of claim 11 wherein said step of assigning comprises assigning each word stem a vector with all zeroes except for one value in said vector such that the location of said one value in a vector is different for the vector of each of said word stems in said core group.

13. The method of claim 11 wherein said step of combining comprises for each word stem, multiplying context vectors corresponding to word stems located within a predetermined number of words of said each word stem in each of said series of words by a proximity factor, summing the product vectors formed by all said multiplications and normalizing the sum vector.

14. A method for revising a dictionary of context vectors having a context vector for each of a first plurality of word stems comprising:
providing a database with a plurality of records;
providing a counter for each word stem, said counter indicating how many times the word stem appears in said plurality of records;
adding a new record to said database;
performing the following steps for each of a second plurality of word stems found in said new record:
computing a sum vector by combining context vectors based on proximity to said each word stem in said new record of the words corresponding to said context vectors;
multiplying the context vector corresponding to said each word stem in said dictionary of context vectors by the counter corresponding to said each word stem to get a product vector;
combining the sum vector with said product vector to give a normalized vector;
incrementing the counter corresponding to said each word stem;
replacing the context vector corresponding to said each word stem with said normalized vector.

15. A method for generating a dictionary of context vectors comprising:
providing a corpus of records, each including a series of words wherein each word corresponds to one of a plurality of word stems;
generating a context vector for each of a core group of word stems;
temporarily assigning a zero context vector to the remaining word stems in said plurality of word stems that are not in said core group;
serially proceeding through the corpus of records and for each word stem that is not in said core group:
combining context vectors based on proximity in each of said series of words between the word corresponding to said word stem and the words corresponding to said context vectors to generate a sum vector for said word stem;
combining the sum vector with the context vector assigned to said word stem to generate a replacement context vector for said word stem.

16. The method of claim 15 further comprising initializing a counter corresponding to each of the word stems that are not in said core group before serially proceeding through the corpus and incrementing the counter corresponding to a word stem when a replacement context vector is generated for said word stem.

17. The method of claim 15 wherein said step of combining the sum vector with the context vector includes weighting the context vector in proportion to the counter corresponding to said word stem.

* * * * *